United States Patent
Bortle et al.

(10) Patent No.: US 6,855,306 B2
(45) Date of Patent: Feb. 15, 2005

(54) PROCESS FOR THE RECOVERY OF SODIUM NITRITE

(75) Inventors: Walter H. Bortle, Cochranville, PA (US); Peter A. Monopoli, Wilmington, DE (US)

(73) Assignee: General Chemical Performance Products LLC, Parsippany, NJ (US)

( * ) Notice: Subject to any disclaimer, the term of this patent is extended or adjusted under 35 U.S.C. 154(b) by 319 days.

(21) Appl. No.: 10/255,292

(22) Filed: Sep. 26, 2002

(65) Prior Publication Data

US 2004/0062703 A1 Apr. 1, 2004

(51) Int. Cl.⁷ .................. C01B 21/50; C07D 405/00
(52) U.S. Cl. .................. 423/385; 548/456; 548/473
(58) Field of Search ......................... 423/385

(56) References Cited

U.S. PATENT DOCUMENTS

| | | | |
|---|---|---|---|
| 2,032,699 A | * 3/1936 | Hayes et al. | 423/385 |
| 3,928,543 A | * 12/1975 | Gregory et al. | 423/385 |
| 3,965,247 A | * 6/1976 | Hecklinger et al. | 423/385 |
| 4,009,246 A | * 2/1977 | Wendel | 423/385 |
| 5,068,353 A | 11/1991 | Dellacoletta | |
| 5,709,800 A | * 1/1998 | Ross et al. | 210/762 |
| 6,251,354 B1 | 6/2001 | Greenwell et al. | |

* cited by examiner

Primary Examiner—Wayne A. Langel
(74) Attorney, Agent, or Firm—Arthur J. Plantamura

(57) ABSTRACT

A process is provided for the removal of undesirable organic matter from solutions of sodium nitrite that are generated as byproducts in the manufacture of thermoplastic resins. The process employs certain activated carbon types derived from lignite granular material under conditions that are favorable to promote the absorption of the organic matter of a variety of organic substances that are residuals that remain from organic phase specifications in the plastics manufacture.

7 Claims, 1 Drawing Sheet

Experimental Equipment Diagram

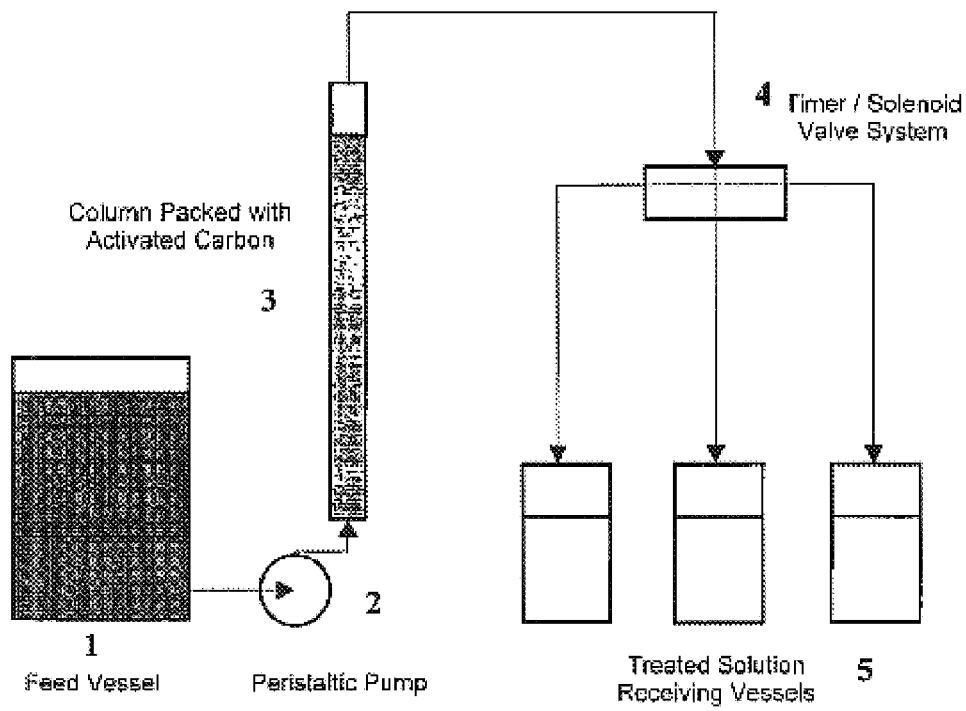
Experimental Equipment Diagram

PROCESS FOR THE RECOVERY OF SODIUM NITRITE

This invention relates to an improved process for the recovery of sodium nitrite from process waste, specifically a process for the removal of undesirable residual organic compounds present in metal nitrite containing waste streams that are generated in the manufacturing of synthetic polymers that employ metal oxide salts in the synthesis reaction, resulting in a purified sodium nitrite stream suitable for commercial use.

BACKGROUND OF THE INVENTION

For a considerable period of time efforts have been directed at recovering the metal nitrites such as sodium nitrite, potassium nitrite, lithium nitrite, or nitrite mixtures containing at least one of the foregoing, from the reaction mixture effluent stream resulting from the manufacture of synthetic resins. One such manufacturing operation, for example, is that in the synthesis of aromatic bis(ether phthalimide) for the production of polyetherimide (PEI) plastics. Of particular interest is the product of a concentrated sodium nitrite solution that is the reaction by-product from the production of polyetherimide resin that contains the order of about one percent total organics; consisting of several organic compounds, including residual organic raw materials, organic catalysts and organic by-products.

Various techniques have been used to recover a constituent from a reaction mixture, one of which includes a solid-liquid separation technique of filtering at a temperature at which the constituent is substantially completely soluble while the alkali metal salt impurities are substantially insoluble. As described, for example, in U.S. Pat. No. 5,068,353, attention has generally been paid primarily to the recovery of the resin products, while the nitrite byproducts have been intermixed with raw materials, catalysts and organic by products mixed in a caustic wash and discarded as waste. More recent attempts to recover a nitrite by-product, such as those represented by U.S. Pat. No. 6,251,354B1, which describes methods for improving the quality of the nitrite stream typically generated with a "caustic wash" by utilizing a technique referred to as "water wash", have provided limited improvement over the prior art in effecting a substantially complete recovery of the nitrite content, free of contaminants. Without further treatment, the residual organics in the water wash containing the nitrite impart undesirable properties, including a deep, dark color and a conspicuous odor to the solution. Another objectionable trait is the water wash solution's tendency to produce foam when agitated, which contributes disagreeable handling qualities. Consequently, complete removal of the organic impurities and these associated undesirable qualities is essential to providing for a commercially acceptable sodium nitrite solution. While techniques to provide for more concentrated and less-contaminated nitrite streams have been identified, the residual organic contaminants heretofore retained in the effluent stream have been persistent and have resisted the attempts to completely separate organics from the aqueous nitrite stream. While various techniques are proposed in U.S. Pat. No. 6,251,354B1 for removing the last traces of residual organic matter, such appear to be only partially successful, resulting in nitrite streams which contain the persistent residual organic compounds or other impurities, introduced by or during the processing, that render nitrite streams inappropriate for commercial use. For example, U.S. Pat. No. 6,251,354B1, teaches the use of activated carbon for removal of the residual organic material from both the water wash aqueous phase sodium nitrite stream, and the permeate from treatment of said stream representing pre-treatment with membrane separation. As represented by TOC measurements, activated carbon removed only 28.6% of the organic matter in the water wash and 65.5% of the residual organic matter in the lower-organic-containing membrane permeate. The higher removal efficiency demonstrated by this unidentified carbon on the permeate versus the water wash suggests that lower starting levels and/or smaller organic molecules (that tend to pass through the membranes while the larger organic molecules are separated), gave improved performance. Still, this incomplete removal does not provide for a purified sodium nitrite stream suitable for commercial use. Also proposed among the purification techniques of that patent is a melt process that results in the destruction of nearly all of the organic matter as the solution is dried and then heated to very high temperatures. While this technique leads to low residual organic matter in the resultant nitrite product, a significant amount of carbonate impurity is introduced during the process, thus in effect trading one impurity for another. Because the existing technology for recovery of the nitrite byproducts has not provided for a usable or salable quality of said byproduct, there is a definite need in the art for a method that enables the recovery of useable metal nitrite content, in particular, sodium nitrite from the reaction mixture formed from the synthesis of aromatic polyetherimide resins.

SUMMARY OF THE INVENTION

The present invention relates to the recovery of usable metal nitrite produced by the removal of undesirable organic matter from solutions of the metal nitrite, especially of sodium nitrite, generated as by-products in the manufacture of certain thermoplastic resins. It has been surprisingly found that through the employment of selected particular activated carbon types, under conditions favorable to promote the adsorption process, that residual organic matter, composed of a mixture of various organic compounds, such as those organic residuals remaining from an organic-aqueous phase separation process, can be practically completely removed and the sodium nitrite recovered as a usable product from the aqueous phase. The system of the present invention has been successfully demonstrated on concentrated sodium nitrite solutions, generated as reaction byproducts from the production of polyetherimide resins, that contain on the order of 1% total organics, consisting of several organic compounds representing residual organic raw materials, catalysts and reaction byproducts. We have discovered that through the employment of lignite-based granular activated carbon, and allowing for extended contact beyond that typically practiced in activated carbon treatment processes for decolorizing or odor removal from water, essentially complete removal of all the organic matter can be accomplished. Prior attempts to purify this type of sodium nitrite byproduct by removing or destroying the organic compounds that serve as undesirable impurities have not been successful in yielding comparable complete and practical impurity removal results. The level of impurity removal attained by the present invention is unexpected in that residual organic material is practically entirely eliminated resulting in a purified sodium nitrite solution free of the organic or other introduced impurities. Although in the U.S. Pat. No. 6,251,345 B1, a broad spectrum of technologies was employed in the purification attempts, the use of any identifiable activated carbon to effect complete removal of the organic materials by those disclosed procedures such that the sodium nitrite could be generated as a salable product, was not demonstrated. The present invention has as its primary objective the purification and recovery of the nitrite content from an otherwise valueless stream of organic-contaminated sodium nitrite byproduct, typically disposed of at significant cost by incineration, to provide a salable sodium nitrite solution, similar in quality to metal nitrite products being offered commercially and which are suitable for a wide array of functional end uses.

BRIEF DESCRIPTION OF THE DRAWING

The drawing illustrates schematically the main components of the stream flow of the nitrite recovery system of the invention.

DETAILED DESCRIPTION OF THE INVENTION

The invention utilizes certain activated carbon types and employs processing conditions that are favorable to the promotion of the adsorption reaction. As consequence, the residuals remaining from an organic-aqueous phase separation process are completely removed from the aqueous phase. The invention is described with reference to concentrated sodium nitrite solutions, generated as a reaction byproduct from the production of polyetherimide resins, that contain on the order of about 1% total organics, consisting of several organic compounds, including residual organic raw materials, organic catalyst and organic byproducts. We have found that through employment of a lignite-based granular activated carbon and allowing for a sufficiently extended contact time, beyond that typically practiced in activated carbon treatment processing for decolorizing or odor removal from water, a complete removal of the organic matter is effected. Prior attempts to cleanse this type of sodium nitrite byproduct by removing or destroying the organic compounds that comprise the undesirable impurities have not been fruitful. The present invention thus affords a means to treat an otherwise essentially valueless stream of organic-contaminated sodium nitrite byproduct, that is typically disposed of at significant cost by incineration, into a salable sodium nitrite solution product, similar in quality to that being currently commercially manufactured and useful for a wide array of functional end-uses.

The lignite based activated carbon contemplated by the invention is the granular activated carbon derived from the brownish black coal intermediate between peat and bituminous coal and generally characterized as a somewhat amorphous substance in which the texture of wood is perceptible in this brownish coal intermediate.

In the utilization of the granular activated carbon in accordance with the invention, the recommended range of contact flow rates for the liquid in the activated carbon bed is about 0.1–3.0 bed volumes per hour (BV/hr), corresponding to total contact times of 0.33 to 10 hours between the activated carbon and nitrite containing effluent. Within this recommended range, the specific value chosen depends upon, according to the published literature of the manufacturer (Norit Americas, Atlanta, Ga.) "the degree of purification desired, the type and concentration of impurity, the nature of the process liquid, and pressure drop. Generally high levels of purification, high impurity concentration and high viscosity's will require a lower flow rate. The carbon performs more efficiently at low flow rates (longer contact times), but maybe at the expense of the amount of a liquid that can be processed through a column in a given time."

The discovery of the effectiveness of the lignite-based granular activated carbon at removing all traces of organics was while operating a single column at about 0.13 BV/hr, or about the minimum rate recommended in the activated carbon manufacturer's literature, and much lower than those rates typically practiced in decolorizing or deodorizing water. In testing done at higher rates, within the range recommended by the manufacturer, the lignite-based carbon also initially accomplished complete removal of the organic, although the performance dropped off more rapidly. This result is believed to be indicative that it is the nature of the lignite carbon that is key to the complete removal effect provided by the invention. We have also discovered that lower flow rates through the carbon bed and subsequent longer contact times provide for more efficient use of the carbon. Indeed, in the preferred embodiments to be described, the combination of lignite-based activated carbon coupled with low flow (long contact time) is effective at complete removal of the organics, while maximizing utilization of the carbon's absorptive capacity. While complete removal of the organic is possible through the employment of the invention, a less than completely cleansed product comprising a sodium nitrite with a maximum limit of 100 ppm TOC may be regarded as an acceptable practical level of TOC in a sodium nitrite solution intended for commercial use.

A feature of the lignite-based carbon that effects the thorough removal of the organics in accordance with the invention is believed to reside in the unique properties of the lignite activated carbon's particular pore characteristics. This feature is described by the manufacturer as having the highest average pore diameter versus all other types of carbon.

Per the manufacturer's (Norit Americas; Atlanta, Ga.) published literature, the lignite-based activated carbons are regarded as having the largest pore diameter of all the carbon types. This particular property contributes substantially to allowing for the accommodation of larger molecules of contaminants to be removed from the effluent into the pore structure. Plastic manufacture effluent streams containing the metal nitrite and contaminants are a mixture of organic compounds of varying molecular weight and configuration, some of them of having a high molecular weight. The lignite-based activated carbon material is seen as apparently accommodating all of these molecules well within its pore structures. Among the primary known organic contaminants, are:

Hexaethyl guanidinium chloride
4-nitro-N-methly phthalimide
bisphenol-A, disodium salt
BPA-Bisimide
BPA-Monoimide
4-Nitrophthalic Acid
Other unidentified organics related to the manufacture and/or processing of polyetherimide As shown in the drawing, effluent from holding container is fed thorough the pump through the activated carbon column 3 to a plurality of receiving tanks for the designated time to effect the desired purification separation of the nitrite from the organic contaminants.

The details of the invention will be more fully understood by the following examples which illustrate the process of the invention. While the invention is particularly advantageous when applied to aqueous alkali nitrite contaminant containing streams, it will be apparent to one skilled in the art that the invention may be applied to other organic-laden inorganic salt streams resulting from similar or comparable processing operations. It will be understood that the examples are provided for illustrative purpose and are not to be construed as limiting the invention except as may be specifically required by the claims.

EXAMPLE 1

Lignite-based granular Activated Carbon was used for the removal of organic contamination from a sample of 40% NaNO$_2$ containing residual organics of about 6630 ppm TOC. The numbers in the description refer to the accompanying figure. A glass column (3) of 19.5 inches high and 1 inch in diameter was prepared for use in treating the solution. A peristaltic tubing pump (2) was attached at the column's base with size 13 tubing while the top was fitted with a stopper and tubing for the collection of the treated solution in a series of collection vessels (5). Lignite derived granular activated carbon (Darco 12×40 activated carbon obtained from Norit) was added dry, 50 grams, to the column to a height of 10 inches, corresponding to a bed volume of 128.7 cm$^3$. The solution was pumped from a feed vessel (1) to the column in an upward-flow configuration at a 0.3 ml/minute (0.14 BV/hr) rate starting at 1430 hours on Day 1. By 1700 hours, the red-orange solution was just beginning to wet the bottom portion of the carbon. The pumping was continued to fill the column and the treated solution was allowed to overflow the column and collected in a glass bottle. A system (4) of tubing, solenoid valves, and electronic timers was employed to collect samples at intervals during overnight operation of the apparatus. The system is represented in the accompanying figure.

The following morning at 0830 hours, 60 grams of very light yellow solution was in the collection bottle. A portion of this solution was sampled and analyzed for TOC. Its TOC value was excellent, expressed as "not detectable" based on a 1 ppm detection limit.

Between 0830 and 1130 hours on Day 2, another 56 grams of treated solution was collected followed by a sample collected between from 1130 and 1430 hours with 53 grams. Both of these samples were similar in color to the first collected. A sample from 1430 to 1630 hours containing 37 grams was analyzed for TOC and found "not detectable" based on the same 1-ppm TOC detection limit.

On Day 3, the next morning, at 0830 hours, 270 grams of treated solution was collected. It has a more intense yellow color. The 56 gram sample collected from 0830 to 1430 hours had 75 ppm TOC with an even more yellow color. Another 50 grams was bottled from 1130 to 1430 hours and had a slight orange coloration. The 1430 to 1630 hour sample of 35 grams was similar to the previous sample in color and showed no foaming properties. The TOC value in this sample was 1500 ppm, indicating a significant decrease in the carbon's effectiveness.

The following morning, Day 4 at 0830 hours, 823 grams was collected overnight from 1630 hours the previous day. The liquid's color was light orange with a slight foaming property. It was analyzed as having 3790 ppm TOC. The system to ran until 1130 hours and collected another 49 grams of darker orange colored solution. It also had a significant foaming characteristic, similar to that of the starting material.

Shown in the Table below is a summary of the granular activated carbon column test for organics removal on the NaNO$_2$ byproduct from the manufacture of polyetherimide resin; the results demonstrate a very good organics removal from the treated streams. Shown in the Table 1 below is a summary of the data for Example 1:

TABLE I

Treatment of Water Wash Sodium Nitrite Stream
Low Feed Rate

| Sample | Quantity | TOC |
|---|---|---|
| Day 1 1430 h Start | 0 | 6420 ppm |
| Day 1 1430 h to Day 2 0830 h | 60 grams | <1 ppm |
| Day 2 0830 h to 1130 h | 56 grams | NA |
| Day 2 1130 h to 1430 h | 53 grams | NA |
| Day 2 1430 h to 1630 h | 37 grams | <1 ppm |
| 1630 h to Day 3 0830 h | 270 grams | NA |
| Day 3 0830 h to 1130 h | 56 grams | 75 ppm |
| Day 3 1130 h to 1430 h | 50 grams | NA |
| 1430 h to 1630 h | 35 grams | 1500 ppm |
| Day 3 1630 h to Day 4 0830 h | 283 grams | 3790 ppm |
| Day 4 0830 h to 1130 h End | 49 grams | NA |

NA-Not Analyzed

EXAMPLE 2

Granular Activated Carbon was used for the removal of organic contamination from the same starting sodium nitrite solution as that of Example 1 and using equipment similar to that described in Example 1. Again, 50 grams of Norit 12×40 Darco granular activated carbon was used. In this test, the carbon was wetted with deionized water, then allowed to drain overnight prior to feeding the solution to be treated. The solution was pumped to the column in an upward-flow configuration, this time at a rate of 1.2 ml/minute (0.56 BV/hr). This represents a four-fold increase in rate versus the test in Example 1. The treated solution collected was very light yellow at the start, representing some dilution from displacement of the retained water from wetting the carbon.

The solutions became increasingly dark in color over the length of the run. TOC levels rose at a faster pace, taking into account the accelerated rate of feed. After 449 grams of treated solution were collected by 1655 hours on Day 1, the TOC had already risen to 272 ppm, over 3.5 times the 75 ppm TOC value achieved after 476 grams (a greater quantity) had been collected in the test represented by Example 1. This clearly illustrates the advantage gained by feeding the solution at the lower rate. However, the organic removal efficiency even at this higher rate of feed is still greater than 96%, surprisingly and unmistakably superior to any activated carbon treatment heretofore achieved by any known prior art method.

Shown in the Table II below is a summary of the data for Example 2:

TABLE II

Treatment of Water Wash Sodium Nitrite Stream
Higher Feed Rate

| Sample | Quantity | TOC |
|---|---|---|
| Day 1 0835 h Start | 0 | 6630 ppm |
| Day 1 1125 h to 1325 h | 108.5 grams | 13 ppm |
| Day 1 1325 h to 1510 h | 128.3 grams | 36 ppm |
| Day 1 1510 h to 1645 h | 117.7 grams | 114 ppm |
| Day 1 1645 h to 2000 h | 94.8 grams | 272 ppm |
| Day 2 0000 h to 0815 h | Est. 654 grams | 2660 ppm |
| Day 2 0815 h to 1000 h | 81 grams | 5690 ppm |
| Day 2 0815 h to 1000 h | 124.8 grams | 4690 ppm |

EXAMPLE 3

Granular Activated Carbon was used for the removal of organic contamination from a sample of sodium nitrite water wash membrane permeate containing residual organic of about 1940 ppm TOC. This solution had a deep yellow color and showed foaming characteristics. The equipment used was again similar to that described in Example 1. Again, 50 grams of Norit 12×40 Darco granular activated carbon was used. In this test, the carbon was again wetted with deionized water, then allowed to drain overnight prior to feeding the solution to be treated. The solution was pumped to the column in an upward-flow configuration at the 1.2 ml/minute (0.56 BV/hr) rate, the same as used in Example 2 and a four-fold increase in rate versus the test in Example 1. The treated solutions in this test started out much lighter in color and did not show any foaming, even at the end, after the test had run over 24 hours. Over the duration of the test, the samples collected proceeded to become progressively darker yellow. TOC levels remained low throughout the first day of the test. At the start of Day 2, the TOC was at 37 ppm, representing 98% removal of the organics. By the end of the test the residual TOC had risen only to 333 ppm, still representing over 82% removal of the organics. The excellent performance at this higher rate on the less-contaminated starting material is suggests that the lignite carbon's properties are particularly well suited to the task of removing these organics.

Shown in the Table III below is a summary of the data for Example 3:

TABLE III

Treatment of Membrane Permeate Sodium Nitrite Stream

| Sample | Quantity | TOC |
|---|---|---|
| Day 1 0858 h Start | 0 | 1940 ppm |
| Day 1 1125 h to 1325 h | 101.2 grams | 12 ppm |
| Day 1 1325 h to 1510 h | 129.1 grams | NA |
| Day 1 1510 h to 1645 h | 120.0 grams | NA |
| Day 1 1645 h to 2000 h | 225.7 grams | 17 ppm |
| Day 1 2000 h to 2400 h | 259.1 grams | NA |
| Day 2 0000 h to 0815 h | 650.0 grams | NA |
| Day 2 0815 h to 1000 h | 124.8 grams | 37 |
| Day 2 1000 h to 1145 h | 126.8 grams | NA |
| Day 2 1145 h to 1330 h | 127.0 grams | NA |
| Day 2 1330 h to 1500 h | 109.4 grams | NA |
| Day 2 1500 h to 1630 h End | 108.3 grams | 333 |

NA-Not Analyzed

While the invention has been described with reference to the preferred embodiment, this description is not intended to be limiting. It will be appreciated by those of ordinary skill in the art that modifications may be made without departing from the spirit and scope of the invention claimed.

What is claimed:

1. A process for recovery of a purified alkali metal nitrite from a plastics manufacturing effluent byproduct contaminated stream containing the nitrite and organic impurities comprising the steps of:

a) subjecting the contaminated alkali-metal nitrite solution to contact with a lignite-based activated carbon product, b) allowing sufficient contact time to effect complete removal of the organic compounds, and c) continuing the contact time until a resulting alkali-metal nitrite solution, exhibiting a measurable total organic carbon (TOC) level of less than the detection limit of 1 ppm TOC, is obtained.

2. The method of claim 1 wherein the metal nitrite is sodium nitrite.

3. The method of claim 1 wherein the starting organic content of the alkali-metal nitrite stream is about 5000–6500 ppm TOC.

4. The method of claim 1 wherein the starting organic content of the alkali-metal nitrite solution is about 750 to 3000 ppm TOC.

5. The method of claim 1 wherein the final organic content of the alkali-metal nitrite solution is less than 100 ppm TOC.

6. The method of claim 1 wherein the effluent from which the nitrite is recovered is that from the manufacture of polyetherimide (PEI) plastics.

7. The method of claim 6 wherein the metal nitrite is sodium nitrite.

* * * * *